United States Patent
Taras et al.

(10) Patent No.: US 8,109,101 B2
(45) Date of Patent: Feb. 7, 2012

(54) HEATING, VENTILATION, AIR CONDITIONING AND REFRIGERATION SYSTEM WITH MULTI-ZONE MONITORING AND DIAGNOSTICS

(75) Inventors: Michael F. Taras, Fayetteville, NY (US); Alexander Lifson, Manlius, NY (US)

(73) Assignee: Carrier Corporation, Syracuse, NY (US)

( * ) Notice: Subject to any disclaimer, the term of this patent is extended or adjusted under 35 U.S.C. 154(b) by 580 days.

(21) Appl. No.: 12/375,277

(22) PCT Filed: Oct. 23, 2006

(86) PCT No.: PCT/US2006/041572
§ 371 (c)(1),
(2), (4) Date: Jan. 27, 2009

(87) PCT Pub. No.: WO2008/051222
PCT Pub. Date: May 2, 2008

(65) Prior Publication Data
US 2010/0000238 A1    Jan. 7, 2010

(51) Int. Cl.
*F25D 17/06* (2006.01)
(52) U.S. Cl. .................... 62/89; 62/125; 62/513
(58) Field of Classification Search .............. 62/89, 114, 62/115, 125, 157, 428, 498; 165/122, 126, 165/127, 129; 454/306, 355
See application file for complete search history.

(56) References Cited

U.S. PATENT DOCUMENTS

| | | | | |
|---|---|---|---|---|
| 3,572,052 A | * | 3/1971 | Toth ................................. | 62/278 |
| 4,222,435 A | * | 9/1980 | Kumagai ........................ | 165/11.1 |
| 4,698,977 A | * | 10/1987 | Takahashi ........................ | 62/133 |
| 4,928,750 A | * | 5/1990 | Nurczyk ......................... | 165/216 |
| 5,275,012 A | * | 1/1994 | Dage et al. ........................ | 62/208 |
| 5,301,515 A | * | 4/1994 | Iritani et al. ..................... | 62/126 |
| 5,309,731 A | * | 5/1994 | Nonoyama et al. .............. | 62/244 |
| 6,021,644 A | * | 2/2000 | Ares et al. ......................... | 62/151 |
| 6,055,818 A | * | 5/2000 | Valle et al. ....................... | 62/173 |
| 6,237,354 B1 | * | 5/2001 | Cromer ............................ | 62/271 |
| 6,427,461 B1 | * | 8/2002 | Whinery et al. .............. | 62/176.6 |
| 6,792,766 B2 | | 9/2004 | Osborne et al. | |
| 6,826,921 B1 | * | 12/2004 | Uselton ......................... | 62/176.6 |
| 6,895,774 B1 | * | 5/2005 | Ares et al. ........................ | 62/332 |

OTHER PUBLICATIONS

Search Report and Written Opinion mailed on Mar. 21, 2007 for PCT/US2006/41572.

* cited by examiner

*Primary Examiner* — Mohammad Ali
(74) *Attorney, Agent, or Firm* — Carlson, Gaskey & Olds, PC

(57) ABSTRACT

A multi-zone HVAC&R system has its control programmed to provide diagnostic testing of air handling components and refrigerant components associated with each climate controlled zone in sequence. The control changes the original position of the corresponding component and a resultant change in a relevant operational parameter is sensed. If the actual change is outside of the tolerance band associated with the expected change, then the determination is made that the component under consideration is malfunctioning. The periodicity of a diagnostic procedure for a particular component is typically defined by its criticality and reliability level. If the change in the corresponding operation parameter is recorded and stored in the database, the component degradation can be observed over time and a prognostic prediction can be made when a particular component requires preventive maintenance or replacement.

20 Claims, 1 Drawing Sheet

HEATING, VENTILATION, AIR CONDITIONING AND REFRIGERATION SYSTEM WITH MULTI-ZONE MONITORING AND DIAGNOSTICS

This application is a United States National Phase application of PCT Application No. PCT/US2006/041572 filed Oct. 23, 2006.

BACKGROUND OF THE INVENTION

This application relates to a heating, ventilation, air conditioning and refrigeration (HVAC&R) system in which conditioned air is delivered to a plurality of climate controlled zones, and wherein a monitoring and diagnostic test procedure is provided for system components associated with each of the climate controlled zones.

Refrigerant systems are known, and are utilized in many applications, such as air conditioning, refrigeration and heat pump systems, to condition (maintain the temperature and humidity) of air being delivered into a climate controlled environment. Other secondary fluids (rather than air), such as water or glycol, can be utilized as well. A single refrigerant system that provides conditioned air to a plurality of distinct climate controlled zones is not an uncommon application in the modern HVAC&R field. As an example, the climate controlled zones may be different rooms or offices within a single building or different refrigeration compartments kept at different temperatures. Each of the climate controlled zones is typically provided with individual controls such that an occupant of the particular zone can demand a desired temperature and/or humidity as well as fresh air amount.

In such a complex refrigerant system, it is difficult to diagnose a malfunctioning system component. Since a single refrigerant system provides comfort to different climate controlled zones, any number of zones may be associated with properly functioning equipment, while one of the climate controlled zones may be associated with a malfunctioning component. If such a problem is not identified and isolated in a timely manner, the malfunctioning or broken component can cause secondary system damage to other components. Also, malfunctioning equipment in one zone may affect operation of system components in the other zones causing discomfort to the clime controlled zone occupants. Typically, such a malfunctioning component could be associated with internal refrigerant circuitry (e.g. valves or heat exchangers), or could be an external air side component (e.g. dampers or air side economizers).

Some multi-zone systems have dedicated refrigerant circuit components such as heat exchangers or valves, and air side components such as dampers or economizers, associated with each zone. These components could malfunction, and it is a difficult task to pinpoint the root cause of a problem during troubleshooting in a timely and cost effective manner.

SUMMARY OF THE INVENTION

In a disclosed embodiment of this invention, periodically (for instance, at each system shutdown) a control unit will individually step through each zone and evaluate respective zone components. During the evaluation, a refrigeration valve, an air damper, an air side economizer, etc. are switched between ON and OFF positions (e.g. opened and closed). A change in corresponding operating parameters, such as a refrigerant suction pressure, a saturation suction temperature, an air supply temperature, a zone temperature, is observed. If the component is broken, no change in the sensed condition will occur. On the other hand, if the component is functioning properly, then a step change in a corresponding operational parameter will be registered.

While it would be most convenient to perform this system check just prior to system shutdown, a similar check could be executed during normal operation, or when a particular zone is shut down or initially brought on line.

In one example, an air damper may be closed to shut off the flow of air supplied into a conditioned environmental zone. A subsequent reduction in a suction pressure (or other related operational parameters) of the refrigerant circulating through the heat exchanger associated with this zone should be observed, if the damper is functioning properly. In another example, a properly operating refrigerant flow control device, such as an isolation valve, may be closed and, as a result, a saturation suction temperature should decrease and a discharge temperature should typically rise. Other system operational characteristics can be considered as well. If the refrigerant circuitry associated with a single zone is deactivated, and an air side economizer is opened to bring in only outside air into the zone, then a zone temperature and an outside temperature should approach each other. Many other examples of similar component functionality and performance tests would be apparent to a worker ordinarily skilled in this art.

The frequency and sequence of the diagnostics for each component may be based in part on the reliability of a particular component or the component's criticality for normal system operation. In one of the disclosed embodiments, it is proposed that such a diagnostic check is performed at least once a day. If performance degradation of a critical component is monitored and recorded over a period of time, it can form a basis for a prognostic toolbox. The present invention is particularly powerful, in that no additional expenditure is required for any extra system components. All that is required is software changes in the main controller logic.

The information gathered by the diagnostics can be transmitted to a remote maintenance site over information carrying media such as Internet.

These and other features of the present invention can be best understood from the following specification and drawings, the following of which is a brief description.

DETAILED DESCRIPTION OF THE PREFERRED EMBODIMENTS

Figure 1:
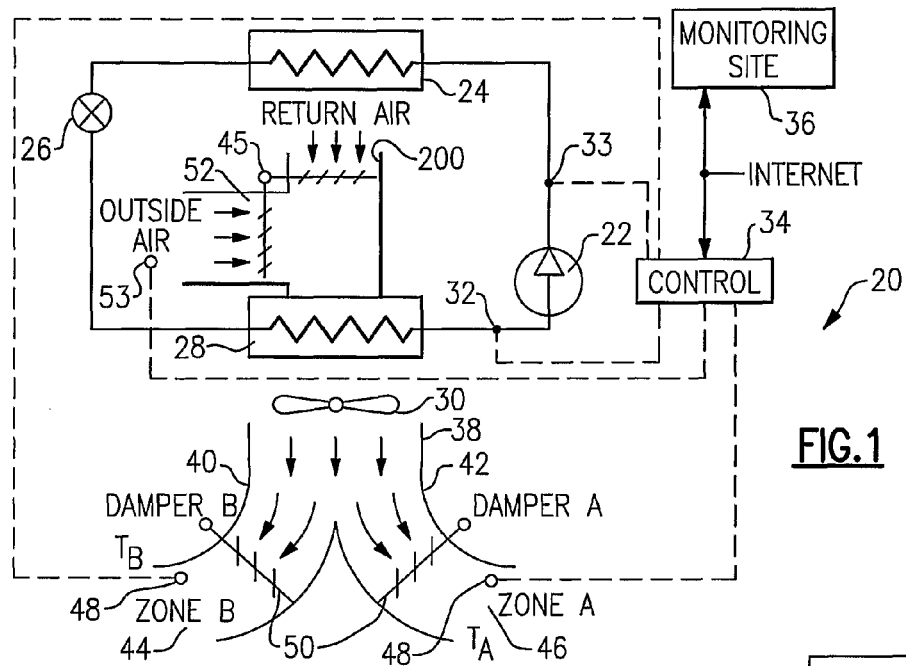
FIG. 1 shows a first schematic of the present invention.

FIG. 1 shows a refrigerant system 20 having a compressor 22 compressing a refrigerant and delivering the refrigerant to a condenser 24. An expansion device 26 is positioned downstream of the condenser 24, and an evaporator 28 is positioned downstream of the expansion device 26, both with respect to refrigerant flow throughout the system. An air mover such as a fan 30 blows air over the evaporator 28 and delivers the air into a common air supply duct 38 leading to separate ducts 40 and 42 delivering the conditioned air into separate climate controlled zones 44 and 46. As known, temperature sensors 48 are positioned within each climate controlled zone to sense the temperature of the air in the zone. Similarly, humidity or carbon dioxide sensors (not shown) may be located within individual air supplied ducts 40 and 42 or within climate controlled zones 44 and 46. Dampers 50 are controlled by a main system control 34 (or a separate control communicating with the main system control 34) to adjust the openings in the individual air supply ducts 40 and 42 to regulate the amount of conditioned air delivered into each climate controlled zone 44 and 46, as known. As shown, the control 34 communicates over the information carrying media such as the Internet to a remote monitoring (and possibly maintenance) location 36. As further shown, a sensor 32 and/or 33 may sense conditions within the refrigerant system. Such conditions can be, for instance, pressure or temperature. As further shown, an air side economizer 45 mixes air from the outside environment supplied through the fresh air duct 52 with the return air from the conditioned space supplied through the return duct 200. As known, the return duct 200 recirculates air from a zone A and/or B and over the evaporator 28. Air side economizers, such as the economizer 45, are known in the art, installed upstream of the evaporator 28 and indoor air filtration media (not shown), with respect to the indoor airflow, and operate to mix fresh outdoor air with the return air from the conditioned space.

Periodically, the control 34 will cycle through various steps to check the functionality and reliable operation of components associated with each climate controlled zone. As an example, the opening of the damper 50 associated with the climate controlled zone 46 may be adjusted (opened or closed relative to a current position) to allow for more or less air to be delivered to the climate controlled zone 46. The temperature of the air supplied to the climate controlled zone 46 and sensed, for instance, by a temperature sensor 48 should change. Further, as the amount of air being delivered into the conditioned environment and flown over the evaporator 28 changes, the refrigerant conditions sensed, for instance, by sensors 32 and 33 are also expected to change. Less air supplied to the climate controlled zone 46 should correspond to a lower saturation suction temperature or suction pressure measured by the sensor 32 and lower supply air temperature measured by the temperature sensor 48. If this does not occur, then the damper 50 is malfunctioning. Of course, the associated sensors can malfunction as well but it is less likely to happen and can typically be determined by other means such as by comparison to other sensors available in the system or by comparison between measured and expected electric signal level from a sensor by the controller 34.

Similarly, the opening of the air side economizer may be adjusted (opened or closed) to control the amount of the outside air. If the air side economizer 45 is widely open (the damper 50 may be closed at the same time to facilitate the stabilization process) while the refrigerant system compressor 22 is shut down, then the supply air temperature sensed by temperature sensor 48 in the duct 42 communicating to the climate controlled zone 46 should approach the outside air temperature sensed by a temperature sensor 53. If this does not occur, then it is an indication that the air side economizer 45 is malfunctioning. Malfunctioning of or one of the temperature sensors 48 and 53 can be identified by one of separate procedures, as described above. Obviously, an airside economizer can be associated with each climate controlled zone as well.

Figure 2:
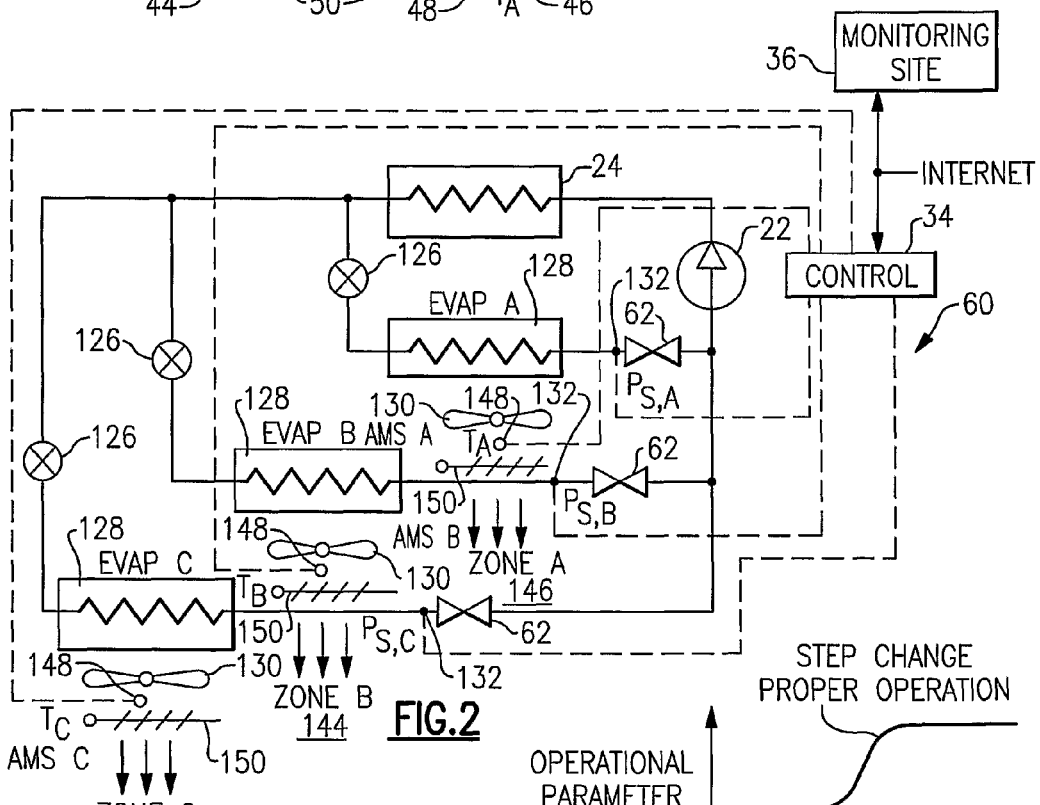
FIG. 2 shows a second schematic of the present invention.

A more complex system 60 is illustrated in FIG. 2. Separate expansion devices 126, evaporators 128 and evaporator fans 130 are associated with separate climate controlled zones 144, 146 and 147. Separate temperature sensors 148 sense the temperature of the air supplied to these climate controlled zones. Separate sensors (e.g. temperature or pressure sensors) 132 are placed on suction lines leading from each of the evaporators 128. This more complex system would allow a higher degree of control, since it also has refrigerant side components dedicated to a particular climate controlled zone. Therefore, it becomes an even more difficult to isolate and diagnose a malfunctioning component. However, a proposed diagnostic procedure will allow to sense and identify problems associated with each refrigerant side component such as the individual evaporators 128, expansion devices 126, or fans 130 (in addition to the air side components, as described above). The method would follow the logic of prior embodiments. As one example, a refrigerant branch associated with one of the evaporators may be shut off, and air still delivered into the associated temperature controlled zone. The air temperature in this zone measured by the relevant temperature sensor 148 should increase as well as corresponding refrigerant temperature or pressure measured by a sensor 132, and if this does not occur the corresponding isolation means such as the expansion valve 126 or a suction valve 62 are not working properly. In another example, a supply air damper 150 may be adjusted from its original position and the corresponding supply air temperature measured by a temperature sensor 148 or refrigerant temperature or pressure measured by the relevant sensor 132 should react accordingly (e.g. decrease when the damper is closing). If this does not happen, then the supply air damper 150 under consideration is malfunctioning. For simplicity, the return ducts and an economizer to mix fresh air with return air are omitted from the FIG. 2. However, they may be also incorporated into design of the refrigerant system 60 and tested in a similar manner, as mentioned above.

Figure 3:
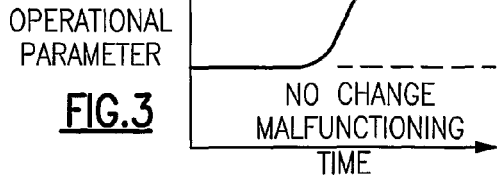
FIG. 3 shows an expected change in at least one operational parameter.

FIG. 3 shows an example of a step change in a relevant operational parameter that would be expected when any one of the diagnostic steps such as mentioned above are taken. The flat dashed line would show the sensed result when the tested system component is malfunctioning. Although FIG. 3 exhibits an upward step change, in some cases a downward step change would be expected (depending on the relationship of action taken and a corresponding operational characteristic). Obviously, only a few examples are presented above that don't cover a full spectrum of multi-zone system components and associated operational parameters, as known in the art. All these system configurations and operational characteristics are within the scope and can equally benefit from the present invention.

The present invention thus provides a simple yet powerful tool for identifying a malfunctioning component in a multi-zone refrigerant system. The system controller steps through system components in multiple climate controlled zones, changes a position of each component in sequence and compares an actual change in corresponding operational parameter (or parameters) with the expected change. The determination whether the component under consideration malfunctions is made if the observed change in the corresponding operational parameter is outside of the tolerance band, as compared to an expected change of the same parameter. In case any of the components is identified as a malfunctioning component, a warning signal can be issued, a maintenance ticket can be produced or a particular branch of the refrigerant system can be disengaged. After a diagnostic check, each component is likely to be brought to its original position. The periodicity of a diagnostic procedure for a particular component is usually defined by its criticality and reliability level. If the corresponding parameter step change is recorded and stored in the database, the component degradation can be observed over time and a judgment can be made in a prognostic manner when this particular component requires preventive maintenance or replacement. In this case, the maintenance can be scheduled in a convenient time and the conditioned space occupant's comfort will not be disrupted. Lastly, other information carrying media (rather than the Internet) such as a secure network, local area network, wide area network, etc. can be utilized to transfer information to a remote location.

Although preferred embodiments of this invention has been disclosed, a worker of ordinary skill in this art would recognize that certain modifications would come within the scope of this invention. For that reason, the following claims should be studied to determine the true scope and content of this invention.

We claim:

1. A refrigerant system comprising:
    a compressor for compressing refrigerant and delivering refrigerant to a first heat exchanger, refrigerant passing from said first heat exchanger to an expansion device, and then to at least one second heat exchanger;
    at least one air moving device for moving air over said at least one second heat exchanger and into at least one air duct, said at least one air duct delivering conditioned air into a plurality of climate controlled zones, with each of said climate controlled zones having at least one of separate air handling components and refrigerant system components; and
    a control for said refrigerant system, said control being programmed to periodically perform diagnostic testing of said at least one of air handling and refrigerant system components in each of said climate controlled zones.

2. The refrigerant system as set forth in claim 1, wherein said at least one air duct includes a single duct delivering air into a plurality of climate controlled zones.

3. The refrigerant system as set forth in claim 2, wherein said air handling components associated with each of said climate controlled zones include at least a supply air damper.

4. The refrigerant system as set forth in claim 1, wherein said air handling components associated with at least one of said climate controlled zones include an air side economizer.

5. The refrigerant system as set forth in claim 1, wherein said at least one second heat exchanger includes a plurality of evaporators, with individual climate controlled zones being provided with conditioned air by individual air moving devices associated with said plurality of evaporators.

6. The refrigerant system as set forth in claim 5, wherein said plurality of evaporators and said plurality of air moving devices are included in said diagnostic steps performed by said control.

7. The refrigerant system as set forth in claim 1, wherein temperature sensors sense the temperature of the air being delivered into said plurality of climate controlled zones, and said sensed temperature being compared before and after the diagnostic step to identify a malfunctioning component.

8. The refrigerant system as set forth in claim 1, wherein a refrigerant condition is sensed both before and after each diagnostic step to determine whether a system component is malfunctioning.

9. The refrigerant system as set forth in claim 1, wherein said control provides information over the Internet to a remote location based upon the diagnostic test.

10. The refrigerant system as set forth in claim 1, wherein multiple components are tested in sequence.

11. The refrigerant system as set forth in claim 1, wherein the tested component is returned to its original state.

12. The refrigerant system as set forth in claim 1, wherein frequency of the diagnostic test depends at least on criticality and reliability of the component.

13. The refrigerant system as set forth in claim 1, wherein the test is performed at least once a day.

14. The refrigerant system as set forth in claim 1, wherein information is recorded and stored over time to determine component degradation.

15. The method as set forth in claim 10, wherein sensors sense the temperature of the air being delivered into said plurality of climate controlled zones, and said sensed temperature being compared before and after the diagnostic step to identify a malfunctioning component.

16. The method as set forth in claim 10, wherein a refrigerant condition is sensed both before and after each diagnostic step to determine whether a system component is malfunctioning.

17. The method as set forth in claim 10, wherein information is provided over the Internet to a remote location based upon the diagnostic test.

18. A method of operating a refrigerant system comprising the steps of:
    providing a compressor for compressing refrigerant and delivering refrigerant to a first heat exchanger, refrigerant passing from said first heat exchanger to an expansion device, and then to at least one second heat exchanger;
    providing at least one air moving device for moving air over said at least one second heat exchanger and into at least one air duct, said at least one air duct delivering conditioned air into a plurality of climate controlled zones, with each of said climate controlled zones having at least one of separate air handling components and refrigerant system components; and
    controlling said refrigerant system by performing diagnostic testing of said at least one air handling components and refrigerant system components in each of said climate controlled zones periodically.

19. The method as set forth in claim 18, wherein said air handling components associated with at least one of said climate controlled zones include an air side economizer.

20. The method as set forth in claim 18, wherein said at least one second heat exchanger includes a plurality of evaporators, with individual climate controlled zones being provided with conditioned air by individual air moving devices associated with said plurality of evaporators.

* * * * *